(12) United States Patent
Weichsel et al.

(10) Patent No.: US 12,293,508 B2
(45) Date of Patent: May 6, 2025

(54) DEVICE AND METHOD FOR TESTING THE CONTENTS OF A SWITCHGEAR CABINET FOLLOWING INSTALLATION ACCORDING TO A PLAN

(71) Applicant: RITTAL GMBH & CO. KG, Herborn (DE)

(72) Inventors: Thomas Weichsel, Erkelenz (DE); Thomas Michels, Troisdorf (DE); Lars Martin, Munzenberg (DE); Judith Zachrai, Herborn (DE)

(73) Assignee: RITTAL GMBH & CO. KG, Herborn (DE)

( * ) Notice: Subject to any disclaimer, the term of this patent is extended or adjusted under 35 U.S.C. 154(b) by 740 days.

(21) Appl. No.: 17/250,565

(22) PCT Filed: Jul. 23, 2019

(86) PCT No.: PCT/EP2019/069830
§ 371 (c)(1),
(2) Date: Feb. 3, 2021

(87) PCT Pub. No.: WO2020/025399
PCT Pub. Date: Feb. 6, 2020

(65) Prior Publication Data
US 2023/0049061 A1    Feb. 16, 2023

(30) Foreign Application Priority Data
Aug. 3, 2018   (EP) .................................... 18187192

(51) Int. Cl.
*G06T 7/00*    (2017.01)
*H02B 1/32*    (2006.01)

(52) U.S. Cl.
CPC .............. *G06T 7/001* (2013.01); *H02B 1/32* (2013.01); *G06T 2207/10028* (2013.01)

(58) Field of Classification Search
CPC . G06T 7/001; G06T 2207/10028; H02B 1/32; H02B 3/00; H02B 1/202; G05B 2219/37205
See application file for complete search history.

(56) References Cited

U.S. PATENT DOCUMENTS

| | | | | |
|---|---|---|---|---|
| 6,608,921 B1 * | 8/2003 | Inoue | .................... | G06T 7/0006 382/150 |
| 7,123,461 B2 * | 10/2006 | Wimmer | .............. | H01H 1/0015 361/93.6 |

(Continued)

FOREIGN PATENT DOCUMENTS

| | | |
|---|---|---|
| EP | 3016221 A1 | 5/2016 |
| WO | 2016/202454 A1 | 12/2016 |

OTHER PUBLICATIONS

Wasenmuller Oliver et al, "Augmented Reality 3D Discrepancy Check in Industrial Applications", 2016 IEEE International Symposium on Mixed and Augmented Reality (ISMAR), IEEE, Sep. 19, 2016 (Sep. 19, 2016), pp. 125-134.

(Continued)

*Primary Examiner* — Feba Pothen
(74) *Attorney, Agent, or Firm* — David B. Gornish; Eckert Seamans Cherin & Mellott, LLC

(57) ABSTRACT

A device for testing the contents of a switch cabinet following installation of equipment components (*2a*-*2e*) according to a plan and the wiring thereof via terminals (6) provided therefor by means of designated electrical cables (5), includes a camera unit (7) for the at least two-dimensional image capture of the components (*2a*-*2e*) fully installed and wired on an installation board (4) of a switch cabinet (1). The device can further include an evaluation unit (8) for carrying out a comparison between an imaged layout (100), (Continued)

Figure 1:
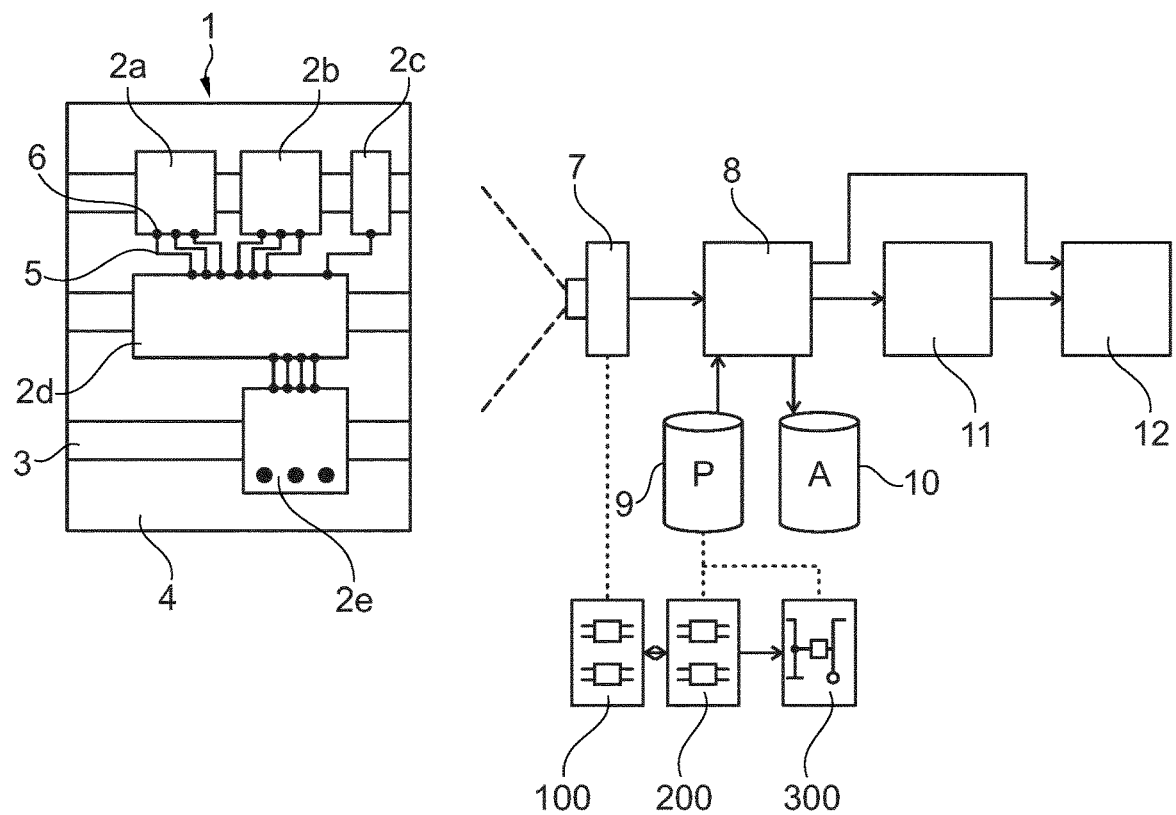

on the basis of the image capture, of the actual state with a provided plan layout (200) of the target state.

11 Claims, 1 Drawing Sheet

(56) References Cited

U.S. PATENT DOCUMENTS

| | | | | |
|---|---|---|---|---|
| 2007/0121257 A1* | 5/2007 | Maitra | ................... | H01H 9/542 |
| | | | | 361/2 |
| 2008/0243311 A1* | 10/2008 | Dahmer | ........... | G05B 19/41845 |
| | | | | 700/286 |
| 2018/0109083 A1* | 4/2018 | Fenker | ................. | H05K 7/1498 |

OTHER PUBLICATIONS

International Search Report from PCT/US2019/069830, dated Oct. 9, 2019.
International Preliminary Report on Patentability dated Aug. 13, 2020 issued in corresponding International Patent Application No. PCT/EP2019/069830.

* cited by examiner

DEVICE AND METHOD FOR TESTING THE CONTENTS OF A SWITCHGEAR CABINET FOLLOWING INSTALLATION ACCORDING TO A PLAN

CROSS-REFERENCE TO RELATED APPLICATIONS

The present application is a National Stage of PCT Application No. PCT/EP2019/069830, filed Jul. 23, 2019 and titled "DEVICE AND METHOD FOR TESTING THE CONTENTS OF A SWITCH CABINET FOLLOWING INSTALLATION ACCORDING TO A PLAN," which claims priority to European Patent Application No. 18187192.2, filed Aug. 3, 2018, the entire disclosure of each is hereby incorporated by reference in its entirety.

FIELD

The present invention relates to a device and a method for testing the contents of a switch cabinet after planning-based assembly of technical components and their wiring via terminal points provided for this purpose by means of marked electrical lines. Furthermore, the invention also relates to a computer program product embodying this method.

The field of the invention relates to switch cabinets.

BACKGROUND

Switch cabinets are used primarily in the context of industrial applications. A switch cabinet of the type of interest here accommodates technical components, which are usually designed in the form of standardised electrical or electronic built-in modules. These technical components are primarily used to control an automated production system, a process engineering system, a machine tool or similar. The built-in modules that are concentrated in the switch cabinet are usually technical components that are not arranged as field devices directly on the machine. For example, programmable logic controllers, universal computing units, frequency converters for speed control, communication modules for bus connections to various bus systems, digital input/output modules or analogue input modules are used as instrumentation components in the sense of the present application. In addition to these electronic components, a switch cabinet usually also contains purely electrical components, for example electrical terminal strips for connecting the electrical cabling at the place of use, which establishes the connection to the power supply and to the machines to be controlled. The production of a switch cabinet with application-specific switch cabinet contents takes place on the basis of an electrical circuit diagram, from which a planning layout is derived in the planning stage, to which associated parts list information is assigned in addition to information on the positioning of the individual device-related components and their wiring.

Nowadays, such planning and design of the enclosure contents is created using software, for example EPLAN Pro Panel®, which also provides a three-dimensional planning layout, among other things. In addition to the instrumentation components, the planning layout also contains their wiring via the terminal points provided for this purpose on the components, as well as information on the type and route of the electrical cables to be used. In addition, the planning layout also contains a configuration of copper busbars and the like for flexible power distribution systems that is matched to the components. If the technical components are designed in the form of electrical or electronic built-in modules, these can be attached to a mounting plate of the switch cabinet via top-hat rails, for example. To complete the switch cabinet, other optional components such as fans, ventilators, filters, heat exchangers, air-conditioning units, interior lighting systems, cable entries and the like can also be designed and represented by the planning layout.

After the planning has been completed, the result of which is, among other things, a planning layout of the target state of the enclosure contents, its manufacture takes place, which essentially comprises mounting the technical components according to the parts list on a mounting plate of the enclosure and wiring them by means of electrical cables according to the planning layout. This is usually done in an appropriately equipped electrical workshop. After assembly is complete, the switch cabinet contents are usually inspected by qualified personnel and tested with regard to at least partial functionalities, such as cable passages. Such a manual inspection of the switch cabinet contents after assembly requires the preparation of verifiable inspection protocols and is—depending on the complexity of the interconnected technical components—prone to errors.

SUMMARY

It is therefore an object of the present invention to create a device and a method for testing the contents of a switch cabinet after planning-based assembly, which ensures reliable and time-efficient quality testing of even complex switch cabinet contents.

The object is solved in terms of the device by the claims; in terms of the method, the task is solved by the corresponding claims. With regard to a computer program product embodying the method, reference is made to the relevant claims(s). The respective dependent claims set forth advantageous further embodiments of the invention.

The invention includes the technical teaching that a device for inspecting the contents of a switch cabinet after planning-based assembly of the device-technical components and their wiring comprises a camera unit for at least two-dimensional image acquisition of the components completely assembled and wired on a mounting plate of a switch cabinet, an evaluation unit for carrying out a comparison between an image layout of the ACTUAL state based on the image acquisition with a provided planning layout of the TARGET state, and an output unit for providing the test result on the at least structural consistency of the switch cabinet for an assessment with regard to delivery release or fault rectification. In doing so, the evaluation unit carries out the said comparison at least with regard to the following core criteria:
   a) completeness and position of the installed components,
   b) the assignment of electrical terminal connections,
   c) the wiring paths of the electrical lines
   whereby the evaluation unit can optionally also carry out a more in-depth test with regard to the following further test criteria:
      d) the size and type of the selected electrical cabinet, and/or
      e) a correctness of the used wire types of the electrical lines.

The advantage of the solution according to the invention lies in particular in the fact that a manual check of the assembly result of the switch cabinet can be largely dispensed with, whereby the automated check carried out via the layout comparison according to the invention requires a much smaller amount of time. The solution according to the invention is based on the knowledge that the planning layout describing the TARGET state, which is the result of the preceding constructive planning, is suitable, with only minor adjustments, to also serve as a comparison standard for a quality inspection step downstream of the assembly process. This ensures a reliable check of the planned TARGET state against the actually implemented ACTUAL state while minimising any error influencing factors.

The check with regard to completeness and position of the installed components is to be understood in the sense that not only the presence of electrical or electronic installation modules and the like is checked, but also their type, which can be identified by means of the pictorial information and is related to the planning layout with the parts list information. Furthermore, it is checked whether all components are mounted in the intended target position and whether distance dimensions are observed. In addition, the test with regard to the assignment of electrical terminal connections includes a test of whether the terminal connections of the components to be assigned according to the planning layout are wired at all, whereby the wiring courses of the electrical cables are also traced in an in-depth test. If these are partially inaccessible for visual tracing due to cable ducts or bundling due to overlapping, the evaluation unit recognises, for example, the most probable wiring course on the basis of the optically detectable start and end course sections of an electrical line and/or via their identification, which—if it does not contradict the other wiring courses—is assumed to be the given wiring course. For the individual identification of the individual electrical lines, it is also conceivable to provide them with a character coding—for example with machine-readable patterns—which are accessible to an image-technical evaluation. In addition, the image capture by means of the camera unit can also be used to check whether the types of wire used for the electrical lines correspond to the planned specifications with regard to the conductor material, the diameter and the insulation. Furthermore, it is also conceivable to compare the size and type of the selected switch cabinet with the planning specifications and to check it in this respect.

According to a measure improving the solution according to the invention, it is proposed that the evaluation unit for the image processing uses optical filter means with which a graphic abstraction of the image of the layout captured by the camera unit is made possible. Such a graphical abstraction should go in the direction of the representation of the planning layout in order to achieve a high degree of certainty of results via the same or a similar degree of abstraction of the two objects of comparison. Such a graphic abstraction can be realised, for example, by converting it into a strongly contrasted black/white image with a clear line structure, in which only the image components relevant for comparison are contained. Any information gaps can be filled in using well-known image enhancement algorithms.

Preferably, the camera unit should be set up to create a three-dimensional image of the layout, i.e. not just a two-dimensional image. This offers the advantage that the height position of the components and the clamping points can also be recorded and checked against the planning layout, which is normally also three-dimensional. Thus, the solution according to the invention obtains a higher information density of inspection details, so that the inspection quality is further increased.

In addition to a purely visual comparison, the solution according to the invention also makes it possible to carry out an ACTUAL-TARGET comparison via the labelling of the components. This is because each component visibly bears a label prescribed in accordance with applicable standards.

According to a measure that further improves the invention, it is proposed that the evaluation unit, in addition to checking the structural consistency of the switch cabinet, also checks its functional consistency by comparing the functionality created by the components and their connections via the electrical lines with an electrical circuit diagram assigned to the planning layout. This functional check is based on the knowledge that in addition to the planning layout, which preferably provides information regarding the arrangement of the components and their wiring, the electrical circuit diagram is also known, which is normally the input information for the layout planning. On the other hand, through the evaluation of the structural consistency by layout comparison, it is known which concrete components are connected to each other and how, so that with regard to the actual state, conclusions can be drawn from this to the electrical circuit diagram. In this way, it is also possible to check the functional consistency of the switch cabinet contents.

Based on this, it is also possible to convert the switch cabinet content into a simulation-capable functional model on the basis of the information from the structural and functional test. For this purpose, an optional simulation unit is provided, which can perform a simulation of various operating states of the switch cabinet over a defined period of time on the basis of a positive structural and functional test. Here, the connection configuration of the functional model, i.e. the connected sensors, devices, machines and the like, is also simulated. The simulation can be used to obtain test results, for example with regard to the temperature development in the switch cabinet under different load scenarios. The simulation result enables a deeper quality check with regard to the planning specifications.

The simulation does not have to be carried out at the same time as the visual inspection of the enclosure contents. Normally, programmable logic controllers are only equipped with the respective software after complete switch cabinet assembly, which is usually only available and thus known at a later point in time. The algorithms stored in this control software can therefore also be made available to the simulation model at a correspondingly later point in time, which carries out the full test of the switch cabinet including control software with regard to the overall functionality. In contrast, at least a partial test with regard to the structural and functional consistency of the switch cabinet can be carried out directly after assembly has been completed.

In addition, the solution according to the invention can also be further developed in that the comparison of the actual state with the target state is carried out taking into account permissible tolerance ranges with regard to the installed components, the electrical cables used and/or their installation or routing positions. This results in a good/bad comparison taking into account permissible deviations. In this way, a check can also be made with regard to the minimum distance between two neighbouring components, which should be in the range of 2 to 3 cm, for example. Customer-specific planning specifications with regard to structural boundary conditions can also be mapped here. Furthermore, it is suggested that the test result on the at least structural consistency of the switch cabinet is stored in an archive database in order to preferably maintain a virtual switch cabinet folder for the switch cabinet tested after assembly. In this way, a conventional logging of the test result, for example for certification purposes, can be omitted.

Preferably, the method according to the invention for testing the contents of a switch cabinet after prior planning-based assembly of the components and their wiring is implemented as a computer program product, the program code means of which execute the individual method steps on the aforementioned evaluation unit. This computer program product, which can be stored on a computer-readable data memory, can, for example, be installed on various universally usable local computers or be made available to users as a server solution.

Further measures improving the invention are described in more detail below, together with a description of a preferred embodiment of the invention with reference to the figures. It shows:

DETAILED DESCRIPTION OF THE DRAWINGS

Figure 2:
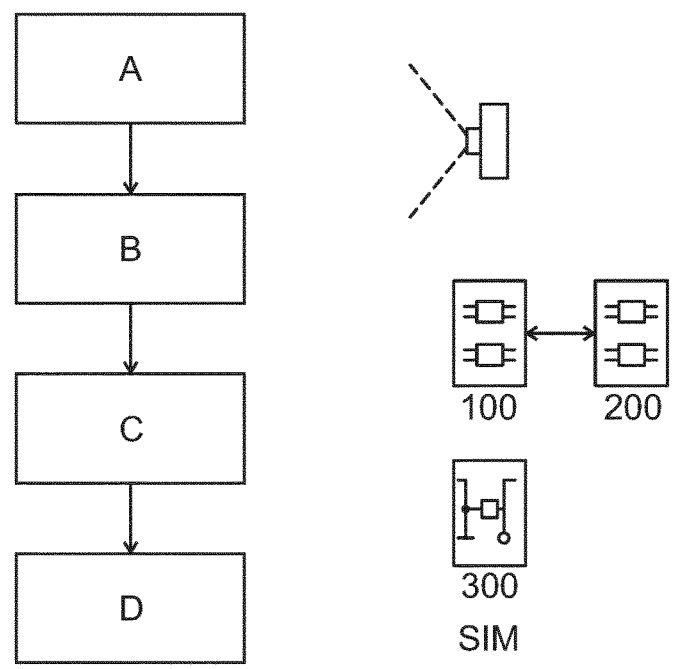

FIG. 1 a schematic block diagram representation of a device for testing the contents of a switch cabinet according to an embodiment of the present disclosure, and FIG. 2 a flow chart of individual steps of the testing procedure to be carried out with this device according to an embodiment of the present disclosure.

DETAILED DESCRIPTION

According to FIG. 1, after assembly carried out in the course of the manufacturing process, a switch cabinet 1 is to be tested, the contents of which contain various technical components 2a to 2e, which are attached to a mounting plate 4 of the switch cabinet 1 via top-hat rails 3 and are wired to one another via various electrical lines 5 (exemplary). For this purpose, each component 2a to 2e has corresponding terminal connections 6 (exemplary), which are designed as screw or plug-in terminal means.

For inspecting the contents of the switch cabinet, a camera unit 7, which is arranged at a distance from the switch cabinet 1 and aligned with the mounting plate 4, is assigned to the switch cabinet 1 and generates a three-dimensional image of the components 2a to 2e that are completely mounted and wired on the mounting plate 4. An evaluation unit 8 connected downstream of the camera unit 7 performs an image-processing comparison between an image layout 100 of the ACTUAL state of the enclosure contents recorded by the camera unit 7 and a planning layout 200 of the TARGET state provided by a computer-aided planning tool.

This comparison is made by means of an image evaluation algorithm which not only reads out the planning layout 200 from a planning database 9, but also the associated parts list information. On this basis, a check is made with regard to the completeness and position of the installed components 2a to 2e, the assignment of the electrical terminal connections 6, the wiring courses of the electrical lines 5 and also the correctness of the types of wire used for this on the basis of the characteristics present on the electrical lines 5, which are accessible to the image-technical evaluation. The image evaluation algorithm is based on a neural system working according to the so-called best mapping method. Since all components to be installed are known from the previous planning, the neural system is able to determine, for example, on the basis of geometric criteria, whether the correct component is actually installed.

The test result generated by the evaluation unit 8 is made available to an output unit 11 connected downstream of it, which represents an information interface to the user in the form of a screen display. This informs the user whether the tested switch cabinet 1 can be released for delivery or requires troubleshooting.

In addition to the structural consistency of the switch cabinet 1, the evaluation unit 8 also checks its functional consistency by comparing the functionality created by the components 2a to 2e and their wiring with an electrical circuit diagram 300 assigned to the planning layout 200. After a positive structural and functional check, a simulation unit 12 connected to the evaluation unit 8 can also carry out a simulation of various operating states of the switch cabinet 1 over a predefined period of time, for example in order to test the temperature behaviour against a corresponding planning specification using simulation technology.

According to FIG. 2, the test procedure of the switch cabinet contents carried out with the above-described device is carried out in which, after the planning-based assembly has been completed, in a first step A an image capture of the switch cabinet contents is first carried out. In a second step B, the image layout 100 of the ACTUAL state of the assembled switch cabinet content is compared with the provided planning layout 200 of the TARGET state. In the subsequent third step C, in addition to the structural consistency of the switch cabinet contents, a functional consistency is also checked with recourse to the electrical circuit diagram 300 linked to the planning layout 200. If the ACTUAL state of the switch cabinet content, which is characterised by its components and their wiring, also corresponds to the circuit diagram specifications, it can be assumed that the functional consistency of the switch cabinet 1 is present. In a fourth step D, building on this and in addition, various operating states are tested over a predefined period of time, for example 24 hours, within the framework of a simulation. In this way, it is possible to find out, for example, whether the switch cabinet contents comply with the thermal limit values or the power consumption specifications with regard to temperature development or power consumption.

The solution according to the invention thus ensures a multi-layered, in-depth automated quality inspection of an assembled switch cabinet, which is not limited solely to the aspects described above by way of example, but also enables other variations within the scope of the following claims. For example, it is also possible to check the correctness of the selected enclosure type as a housing for the component assembly executed on the mounting plate.

REFERENCE SIGNS 1 switch cabinet
2 component
3 top-hat rail
4 mounting plate
5 electrical cable
6 terminal connection
7 camera unit
8 evaluation unit
9 planning database
10 archive database
11 output unit
12 simulation unit
100 image layout
200 planning layout
300 electrical circuit diagram

The invention claimed is:

1. A device for testing contents of a switch cabinet after planning-based assembly of technical components (2a-2e)

and wiring of the technical components via terminal connections (6) provided for the wiring by means of marked electrical lines (5), the device comprising:
- a camera unit (7) for at least two-dimensional image acquisition of the technical components (2a-2e) of the switch cabinet, contents of which are in fully assembled form, wherein the technical components are mounted and wired on a mounting plate (4) of the switch cabinet (1),
- an evaluation unit (8) for carrying out a comparison between an image layout (100) of an actual state based on the image acquisition with a provided planning layout (200) of target state, at least with regard to:
  a) a completeness and position of the installed technical components (2a-2e),
  b) assignment of the terminal connections (6),
  c) wiring of the electrical lines (5),
- an output unit (11) for providing a test result on structural consistency of the switch cabinet (1) for an assessment with regard to delivery release or fault rectification,
- wherein in addition to the structural consistency of the switch cabinet (1), the evaluation unit (8) is also configured to check functional consistency by comparing functionality produced by the technical components (2a-2e) and connection of the technical components via the electrical lines (5) with an electrical circuit diagram (300) associated with the planning layout (200), and
- wherein a simulation unit (12) is provided which, on the basis of a positive structural and functional test, is configured to carry out a simulation of various operating states of the switch cabinet (1) over a predefined period of time in order to test temperature development in the switch cabinet under a given load scenario against a corresponding planning specification, thereby providing a quality check to determine whether the switch cabinet contents comply with thermal limit values at the given load scenario.

2. The device according to claim 1, wherein the evaluation unit (8) further performs the comparison of the actual state with the target state with regard to:
  d) size and type of the selected switch cabinet (1), or
  e) a correctness of the used wire types of the electrical lines (5).

3. The device according to claim 1, wherein the evaluation unit (8) comprises an optical filter means for graphically abstracting an image of the layout captured by the camera unit (7) in order to generate the image layout (100) corresponding to a degree of abstraction of the planning layout (200) for comparison purposes.

4. The device according to claim 1, wherein the camera unit (7) creates a three-dimensional image to detect a height position of the components (2a-2e) and the terminal connections (6) and to take into account when checking against a 3D planning layout.

5. The device according to claim 1, wherein the technical components (2a-2e) are designed as electrical or electronic built-in modules.

6. A computer-assisted method for testing contents of a switch cabinet after preceding planning-based assembly of technical components (2a-2e) and wiring of the technical components via terminal connections (6) provided for the wiring by means of marked electrical lines (5), comprising the steps of:
- image acquisition of the components (2a-2e) of the switch cabinet, contents of which are in fully assembled form after planning-based assembly, the components having been mounted and wired on a mounting plate (4) of the switch cabinet (1) via a camera unit (7),
- carrying out a comparison between an image layout (100) of an ACTUAL state based on the image acquisition with a provided planning layout (200) of TARGET state by means of an evaluation unit (8), at least with regard to:
  a) a completeness of the installed components (2a-2e),
  b) assignment of the terminal connections (6),
  c) wiring of the electrical lines (5), and
- provision of a test result on structural consistency of the switch cabinet (1) for an assessment with regard to delivery release or fault rectification by an output unit (11),
- wherein, in addition to the structural consistency of the switch cabinet (1), the functional consistency is also checked by matching functionality resulting from the components (2a-2e) and connection via the electrical lines (5) with an electrical circuit diagram (300) associated with the planning layout (200), and
- wherein on the basis of a positive structural and functional test, a simulation of various operating states of the switch cabinet (1) is carried out over a predefined period of time in order to test temperature development in the switch cabinet under a given load scenario against a corresponding planning specification, thereby providing a quality check to determine whether the switch cabinet contents comply with thermal limit values at the given load scenario.

7. The computer-assisted method according to claim 6, wherein the comparison of the ACTUAL state with the TARGET state is further performed with respect to:
  d) size and type of the selected switch cabinet (1), or
  e) a correctness of the used wire types of the electric lines (5).

8. The computer-assisted method according to claim 6, wherein, the planning layout (200) is provided by a software-controlled design tool in the form of a layout file with a two-dimensional or three-dimensional representation form.

9. The computer-assisted method according to claim 6, wherein the comparison of the actual state with the target state is carried out taking into account permissible tolerance ranges with respect to the installed components (2a-2e), the electrical lines (5) used or their installation or routing positions.

10. The computer-assisted method according to claim 6, wherein the test result is transferred via the at least structural consistency of the switch cabinet (1) into an archive database (10) for maintaining an electronic switch cabinet folder for the switch cabinet (1) tested after assembly.

11. A computer program product with non-transitory program code means for carrying out the method according to claim 6.

* * * * *